United States Patent [19]
Tobiasz

[11] Patent Number: 5,806,648
[45] Date of Patent: Sep. 15, 1998

[54] FLUID PRESSURE RAM PROVIDED WITH A SLIDING INTERMEDIATE CHAMBER

[75] Inventor: André Tobiasz, Epinay sur Seine, France

[73] Assignee: Valeo, Paris, France

[21] Appl. No.: 714,863

[22] Filed: Sep. 17, 1996

[30] Foreign Application Priority Data

Sep. 19, 1995 [FR] France .................................. 95 10941

[51] Int. Cl.$^6$ ........................... F16D 25/06; F15B 15/24
[52] U.S. Cl. ................. 192/91 A; 92/51; 92/107
[58] Field of Search .......................... 192/58 CA, 91 A, 192/98; 92/51, 107

[56] References Cited

U.S. PATENT DOCUMENTS

| | | | |
|---|---|---|---|
| 4,249,458 | 2/1981 | Massing | 92/51 X |
| 4,587,888 | 5/1986 | Anderson et al. | 92/51 X |
| 4,869,355 | 9/1989 | Corral et al. | 192/85 CA X |
| 5,480,017 | 1/1996 | Uenohara et al. | 192/91 A X |

FOREIGN PATENT DOCUMENTS

| | | |
|---|---|---|
| 0095841 | 12/1983 | European Pat. Off. . |
| 8335830 | 4/1984 | Germany . |

*Primary Examiner*—Thomas R. Hannon
*Attorney, Agent, or Firm*—Longacre & White

[57] ABSTRACT

The invention concerns a fluid pressure ram having a fixed cylindrical control chamber defined radially by inner and outer partitions, in which one axial end of the chamber is closed off by a piston which has a cylindrical housing and in which, in the retracted position of the piston, the inner partition of the chamber is received in the housing. The piston, in the protruding position, is fully disengaged axially from the fixed chamber. Two cylindrical shells provided axially in line with the chamber are provided when the piston is in the retracted position. The shells are able to slide axially with respect to the piston and with respect to the chamber so as to define, in the protruding position of the piston, an intermediate annular chamber which axially extends the fixed chamber and which is closed axially by the piston.

11 Claims, 5 Drawing Sheets

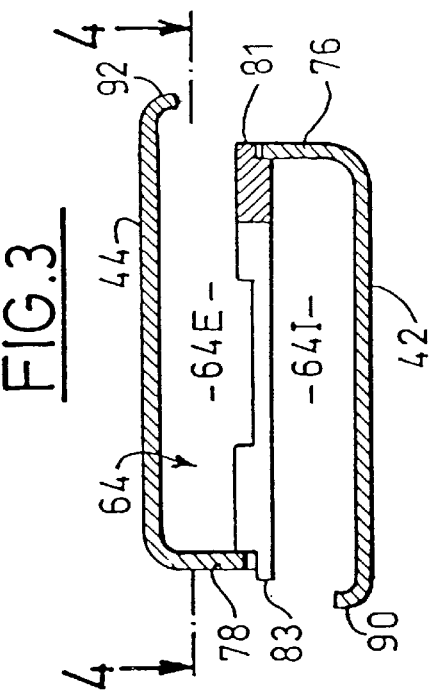
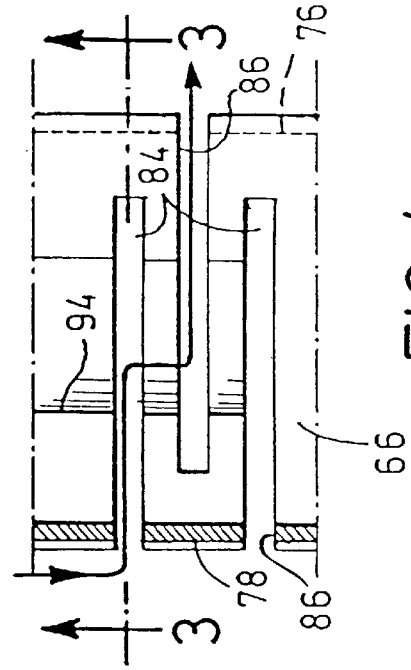
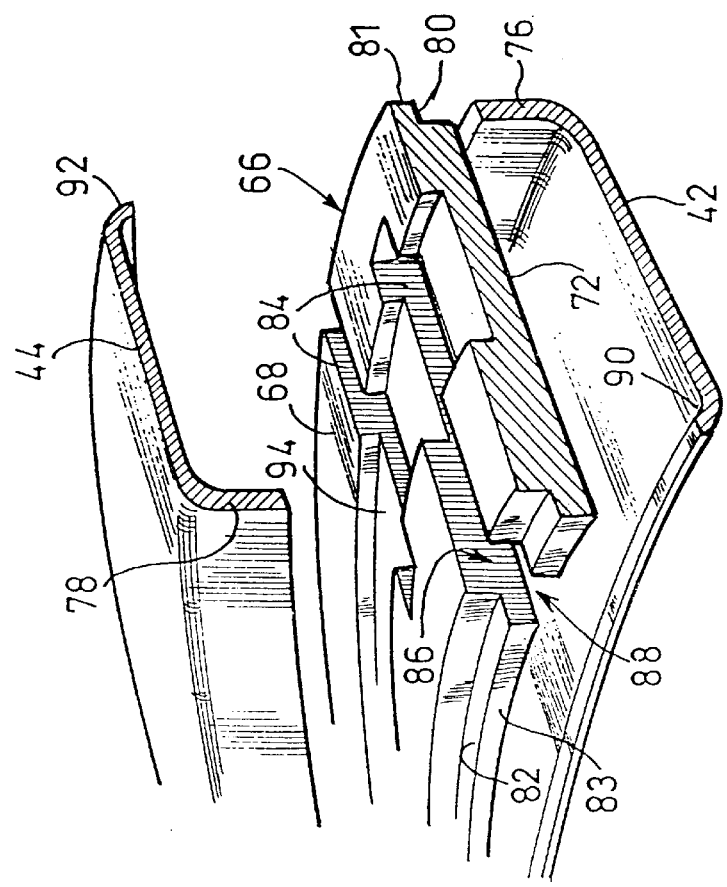

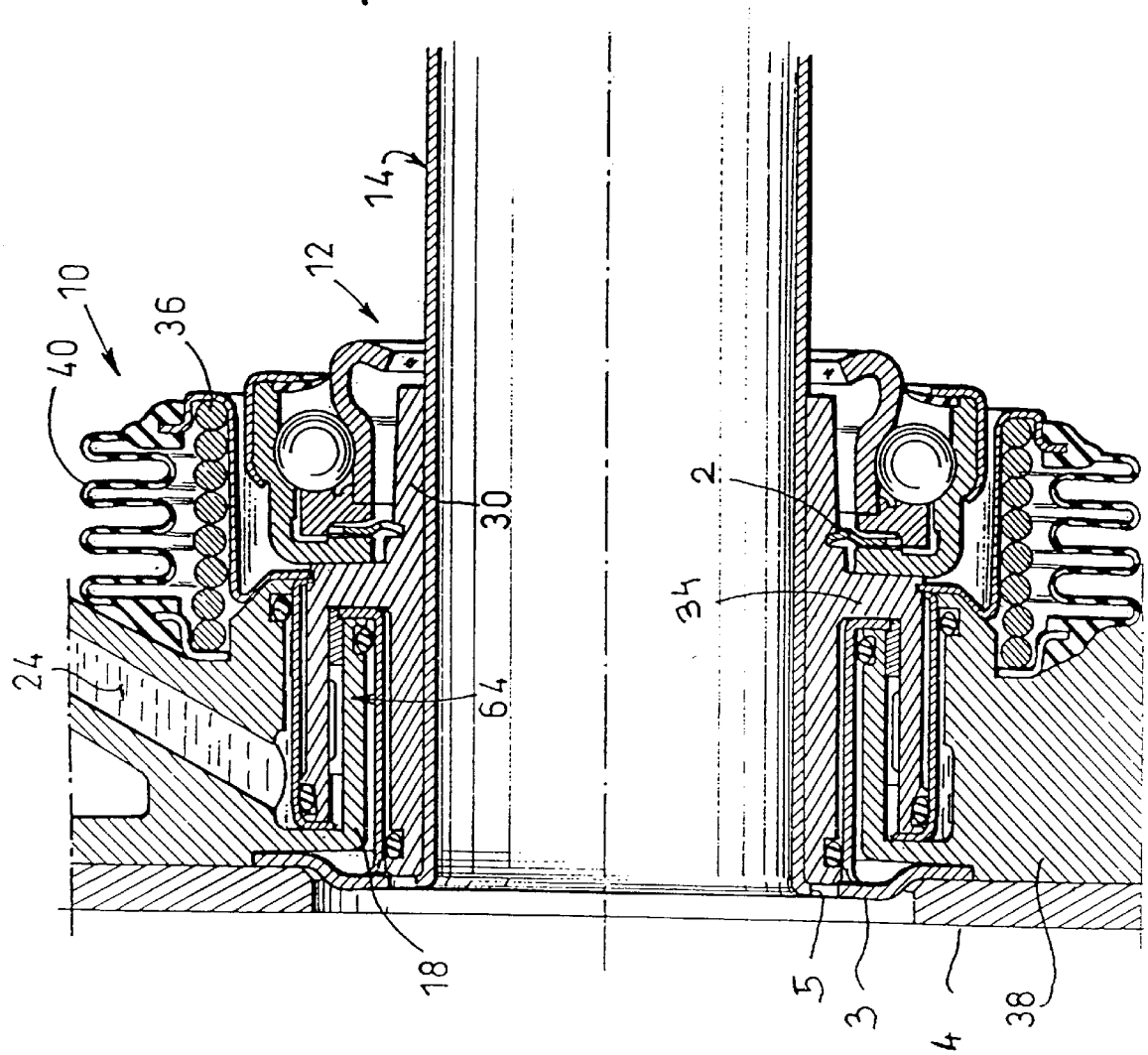

FLUID PRESSURE RAM PROVIDED WITH A SLIDING INTERMEDIATE CHAMBER

FIELD OF THE INVENTION

The invention concerns a fluid pressure ram, and more particularly a fluid pressure ram, notably for controlling the clutch release bearing of a diaphragm clutch of a motor vehicle of the type having a fixed annular cylindrical control chamber supplied with pressurized fluid and defined radially by inner and outer cylindrical partitions, of the type in which one axial end of the chamber is closed off by a piston which has an annular cylindrical housing defined radially by inner and outer cylindrical walls, and open axially in the direction of the chamber, and of the type in which the piston slides axially between a retracted position and a protruding position, of the type in which, in the retracted position of the piston, the inner partition of the chamber is received in the housing and the outer wall of the housing is received in the chamber.

BACKGROUND OF THE INVENTION

The use of a fluid pressure ram, and notably a hydraulic ram, to control the movements of a clutch release bearing is known.

According to a conventional design, such a ram is arranged between the diaphragm of the clutch and the gearbox, around the input shaft of the gearbox.

However, owing to the high force to be supplied in order to produce disengagement, it is necessary to actuate the diaphragm of the clutch by means of a system of levers, which entails the use of a ram with both a long travel and high power.

A ram for a clutch release bearing must also be as compact as possible, along its axial dimension, in order to reduce the length of the clutch/gearbox assembly.

In order to obtain compact rams with sufficient travel, the use is known, for example from the document JP-3 186 620, of a ram with telescopic concentric pistons which axially define a hydraulic chamber for control of the ram.

In such a type of ram, the outer piston is able to move over the length of the hydraulic chamber while the inner piston, which moves with respect to the outer piston, is able to extend the travel of the latter when it arrives in abutment in the protruding position.

However, as soon as the outer piston is in abutment in the protruding position, the active surface of the piston, suitable for generating an actuation force proportional to the active surface and to the pressure of the fluid, is thus considerably reduced so that, at the end of the travel of the piston, the actuation force is much weaker than at the start of the travel.

It is thus necessary to oversize the ram, which has a not insignificant effect on the radial size and weight and price of the ram.

DISCUSSION OF THE INVENTION

Therefore, in order to resolve this problem, the invention proposes a ram of the type seen previously, characterised in that the piston, in the protruding position, is fully released axially from the fixed chamber, in that two cylindrical shells, inner and outer, are provided, which are each interposed between a partition of the chamber and a wall of the housing, respectively inner and outer, in that the shells are arranged axially in line with the chamber when the piston is in the retracted position, and in that the shells are able to slide axially with respect to the piston and with respect to the chamber in order to define, in the protruding position of the piston, an intermediate annular chamber which axially extends the fixed chamber and which is closed off axially by the piston.

According to other characteristics of the invention:

a centring ring for the shells which is cylindrical overall, one inner cylindrical face of which slides on the outer cylindrical face of the inner partition of the chamber and one outer cylindrical face of which slides on the inner face of the outer partition of the piston, in that there are provided means of centring each of the shells with respect to the centring ring, and in that the centring ring is provided with passages to afford free circulation of the pressurized fluid between the fixed chamber and the housing of the piston;

the passages in the centring ring are produced in the form of axial slots evenly distributed angularly;

the slots open out alternately in one or other of the axial ends of the centring ring;

the inner and outer shell respectively has a radial flange which is arranged at a first axial end of the casing received in the chamber, or respectively in the housing, and which is directed radially in the direction of the centring ring on which bears a peripheral edge of the flange to centre the shell with respect to the centring ring;

the peripheral edge of the radial flange is received in a radial step arranged at the corresponding axial end of the centring ring;

the second axial end of the inner and outer shell respectively is provided with an edge folded radially in the direction of the centring ring so as to form an axial stop which cooperates with a complementary stop surface arranged on the inner surface of the inner partition of the chamber, or respectively the outer surface of the outer partition of the housing, so as to limit the travel of the shell and of the centring ring with respect to the fixed chamber, or respectively with respect to the housing 28 of the piston;

the outer surface of the centring ring is provided with a radial groove arranged axially substantially at the centre of the ring;

one of the shells has a radial flange provided with notches to assist the circulation of the pressurized fluid between the fixed chamber and the housing of the piston;

the piston is guided axially on a fixed guide tube;

the clutch release bearing is mounted on the free end of the piston.

BRIEF DESCRIPTION OF THE DRAWINGS

Other characteristics and advantages of the invention will become apparent from the embodiments described with reference to the drawings in which:

FIG. 2 is an exploded perspective view of the shells and of the guide ring of such a ram;

FIG. 3 is an axial half section along the line 3—3 in FIG. 4 of the shells and of the guide ring of a ram according to the invention;

FIG. 4 is a view in cross section along the line 4—4 in FIG. 3;

FIGS. 5, 6 and 7 are axial sections of a ram according to the invention, depicted in three distinct positions, respectively retracted, intermediate and protruding.

DESCRIPTION OF THE PREFERRED EMBODIMENT

The ram 10 which is depicted in the figures is designed to control the axial movements of a ball-bearing type clutch release bearing 12 of a diaphragm clutch (not shown) of a motor vehicle.

Figure 7:
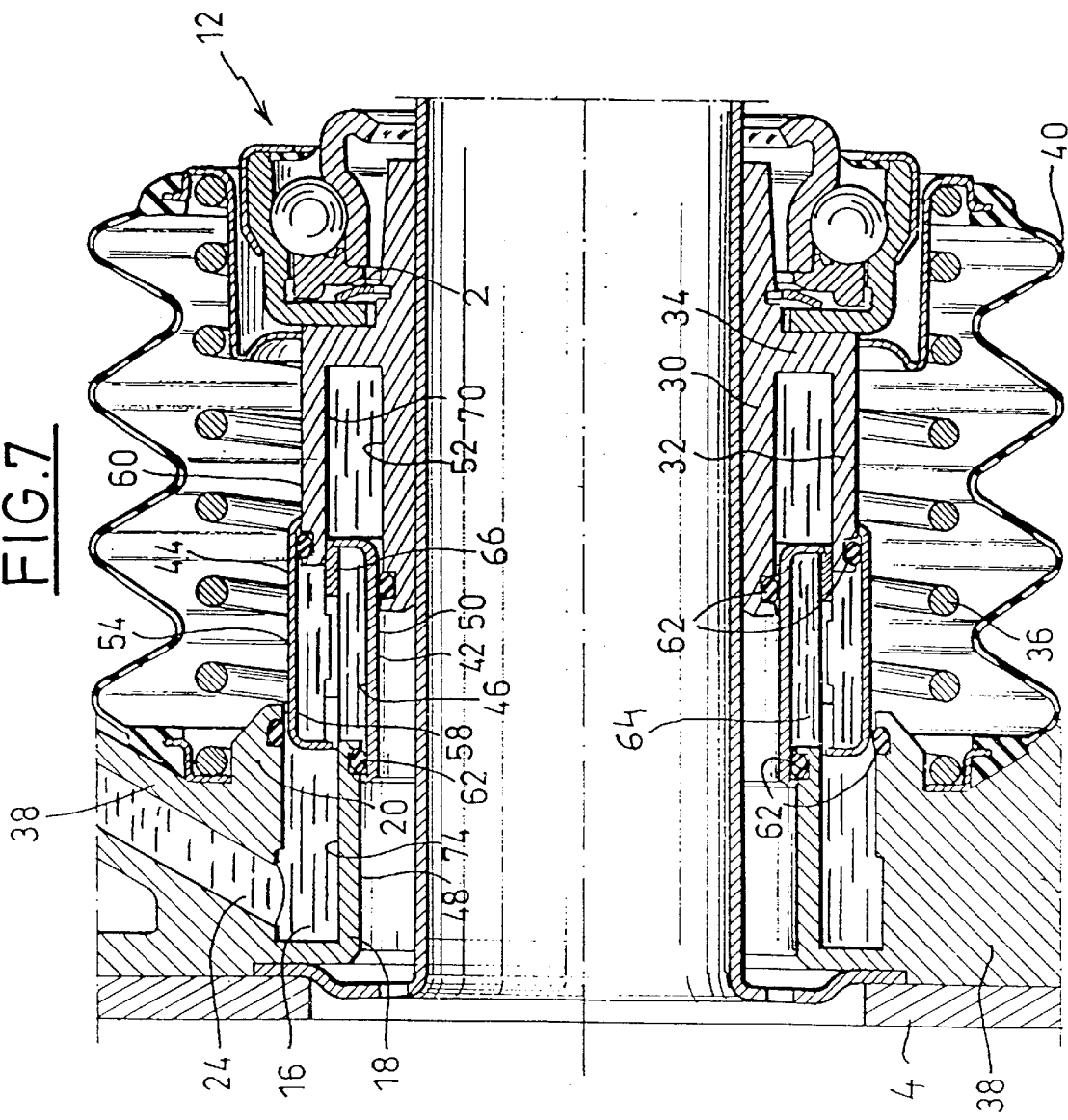

In a manner known per se, the bearing 12 is able to slide about a fixed guide tube 14, which is designed to have an input shaft (not shown) of a gearbox passing through it, between a withdrawn position of the bearing 12 which corresponds to a retracted position of the ram 10, depicted in FIG. 5, and an advanced position of the bearing 12 which corresponds to a protruding position of the ram 10, depicted in FIG. 7.

The ram 10 has a fixed annular cylindrical control chamber 16 defined radially by two axially oriented inner 18 and outer 20 partitions and which is defined transversely at the rear by an annular base 22.

In a known manner, a supply channel 24 opens out into the fixed chamber 16 to connect the latter to a device (not shown) supplying pressurized fluid, usually a master cylinder controlled by the clutch pedal.

The ram 10 also has a piston 26 designed to act on the clutch release bearing 12 and which slides axially on the guide tube 14.

The piston 26 has an annular cylindrical housing 28 which is defined radially by two axially oriented inner 30 and outer 32 walls and transversely by a front annular transverse wall 34. This housing 28 is open in the direction of the chamber 16.

In the example embodiment depicted in the figures, the chamber 16 and housing 28 are blind while being mounted in reverse orientations, so that the outer wall 32 of the housing 28 of the piston 26 slides axially between the inner 18 and outer 20 partitions of the fixed chamber 16, while the inner partition 18 of the fixed chamber 16 is designed to slide axially inside the housing 28 during the axial movements of the piston 26.

It is, nonetheless, possible, without departing from the scope of the invention, to produce a ram 10 in which the piston 26 has a mean diameter greater than that of the fixed chamber 16 so that its inner wall 30 is received inside the fixed chamber 16 during axial movements of the piston 26.

In the example embodiment which is depicted in the figures, a helical compression spring 36 is arranged between the body 38 of the chamber 16 and the piston 26 so as to continuously force the ball bearing 12 against the, diaphragm (not shown) of the clutch.

The spring 36 is arranged outside the ram 10, around the body 38 of the chamber 16 and of the piston 26, while a concertina bellows 40 is disposed around the spring 36 so as to protect the ram 10 from any dust liable to interfere with the sliding of the piston 26.

According to a first aspect of the invention, two annular cylindrical shells, inner 42 and outer 44 are each interposed between a wall of the housing 28 and a partition of the chamber 16. The shells 42 and 44 are therefore axially oriented and in this case are tubular.

Thus the inner shell 42 is in contact through its outer face 46 with the inner face 48 of the inner partition 18 of the chamber 16, while the inner face 50 of the inner shell 42 is arranged opposite the outer face 52 of the inner wall 30 of the housing 28.

In a similar manner, the outer face 54 of the outer shell 34 is arranged opposite the inner face 56 of the outer partition 20 of the chamber 16, while the inner face 58 of the outer shell 54 is opposite the outer face 60 of the outer wall 32 of the housing 28.

The shells 42, 44 are mounted so as to be able to slide axially in a fluid-tight manner with respect to the body 38 of the chamber 16 and with respect to the piston 26 by means of sealing joints 62.

The shells 42, 44 thus define an intermediate chamber 64 which is able to slide axially with respect to the fixed chamber 16 and with respect to the piston 26 and which occupies, when the piston 26 is in the advanced position depicted in FIG. 7, a position in which it axially extends the fixed chamber 16 towards the front.

In this position, according to the invention, the piston 26 is fully disengaged from the fixed chamber 16.

On the other hand, when the piston is in the retracted position depicted in FIG. 5 (or in the intermediate position depicted in FIG. 6), the intermediate chamber 64 is received within the fixed chamber 16, almost all of whose volume it occupies.

In the retracted position, the shells are, according to the invention, arranged in line with the said fixed chamber 16.

According to a second aspect of the invention, a ring 66 for the centring and relative positioning of the shells is arranged radially between the two shells 42, 44.

The centring ring 66 has (FIG. 2) an outer cylindrical surface 68 which slides axially on the inner face 70 of the outer wall 32 of the piston 26 and an inner face 72 which slides on the outer face 74 of the inner partition 18 of the fixed chamber 16.

The purpose of the centring ring 66 is to guide the axial end of each of the inner 42 and outer 44 shells which slide respectively inside the housing 28 and fixed chamber 16.

To this end, the corresponding axial end of each of the shells 42, 44 is provided with a radial flange 76, 78 which extends in the direction of the ring 66 and which bears on the latter in steps 80, 82 arranged at the opposite axial ends 81, 83 of the faces, respectively inner 72 and outer 68, of the ring 66.

The centring ring 66 thus divides the intermediate chamber 64 into two intermediate chambers, inner 64I and outer 64E.

In order to permit the passage of pressurized fluid between on the one hand the intermediate chambers, inner 64I and outer 64E but also to permit communication between the intermediate chamber 64 and on the one hand the fixed chamber 16 and on the other hand the housing 28, the centring ring 66 has longitudinal slots 84 which are distributed angularly in a regular manner and which open out alternately in one and the other of the axial ends 81, 83 of the ring 66, so that the latter is in the form of a coil.

Figure 1:
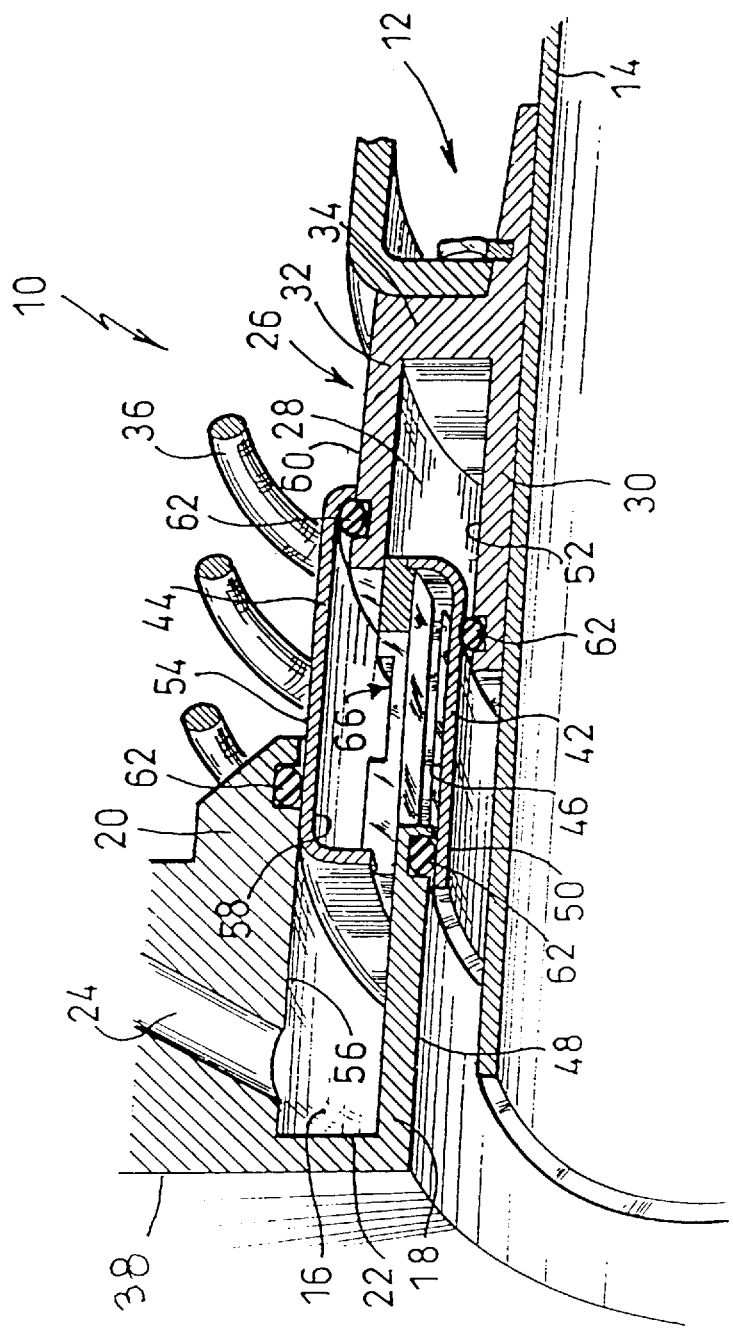
FIG. 1 is a partial perspective view of a ram according to the invention cut along an axial plane.

Thus the axial slots 84 permit communication between the intermediate inner chambers 64I, 64E and also permit communication with the fixed chamber 16 and with the housing 28, as can be seen more particularly in FIGS. 1 and 2. The reason for this is that this communication tends to be blocked off by the presence of the radial flanges 76, 78 on the shells 42, 44.

However, since the latter are received in the steps 80, 82 in the ring 66, there remains, at the opening-out axial end 86 of each of the axial slots 84 in the ring 66, a passage 88 whose dimensions correspond tangentially to the width of the slot 84 and radially to the thickness of the ring 66 level with the steps 80, 82 and which thereby enable the fluid to pass freely from the fixed chamber 16 to the housing 28 via the intermediate chamber 64, and vice versa.

To increase the cross section for the fluid to pass, it is possible to provide radial recesses (not shown) in each of the radial flanges 76, 78 of the shells 42, 44.

In order to limit the axial travel of the shells 42, 44 and of the ring 66, and thereby prevent their completely leaving the chamber 16 or housing 28, the shells 42, 44 are provided, at each of their axial ends opposite the axial end bearing the radial flange 76, 78, with an edge 90, 92 curved in the direction of the ring 66 which is designed to cooperate with complementary bearing surfaces formed respectively on the inner partition 18 of the chamber 16 and on the outer wall 32 of the housing 28.

In the example depicted in the figures, these bearing surfaces are formed by the sealing joints 62.

A groove 94 is arranged radially over the whole circumference of the outer face 68 of the ring 66.

As can be seen in the figures, it is not necessary for the shells 42, 44 and for the centring ring 66 to be thick since these elements transmit no axial force and do not participate in the guidance of the piston 26 produced by means of the guide tube 14.

Thus the shells 42, 44 and the centring ring 66 are able to be produced for example from plastic with a low coefficient of friction. As a variant, the shells 42, 44 can be made of metal.

These elements are not subjected to any axial force because, on the one hand, the pressure is at all times equal in the fixed chamber 16, in the intermediate chamber 64 and in the housing 28 and, on the other hand, because the transverse sections of these elements subjected to this pressure are equivalent overall in both directions.

The operation of the ram 16 according to the invention is described hereinafter.

The ram 10 being in its retracted position depicted in FIG. 5, pressurized hydraulic fluid is injected into the fixed chamber 16 via the supply channel 24.

The fluid then passes through the passages 88 and the slots 84 defined in the ring 66 to supply the intermediate chamber 64 and the housing 28 of the piston 26. The action of the fluid on the front transverse wall 34 of the piston 26 leads to a movement towards the front of the latter as far as an intermediate position depicted in FIG. 6.

In this position, one of the sealing joints 62, arranged on the outer face 60 of the outer wall 32 of the piston 26, bears against the curved edge 92 of the outer shell 44 so that when the piston 26 moves towards its protruding position, it takes the outer shell 44 with it.

The outer shell 44 takes with it the centring ring 66 by means of its radial flange 78 received in the step 82 in the ring 66.

Similarly, the ring 66 takes with it the inner shell 42 whose radial flange 76 is received in the step 80 in the ring 66.

Figure 6:
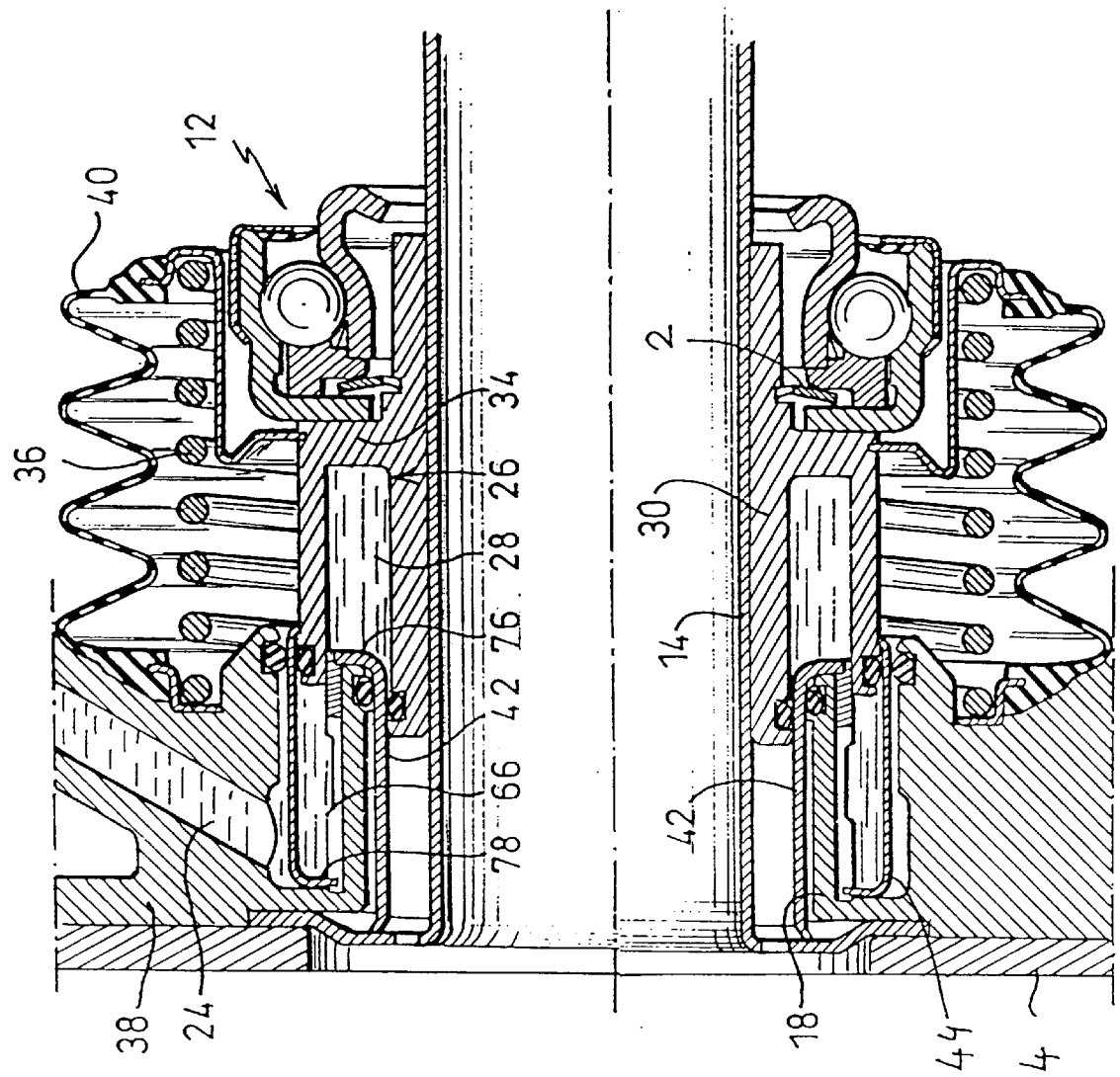

Thus, between its intermediate position depicted in FIG. 6 and its protruding position depicted in FIG. 7, the piston 26 takes with it the shells 42, 44 and their centring ring 66.

When the supply of pressurized fluid is interrupted, the clutch release bearing 12, under the effect of the clutch diaphragm, causes the piston 26 to return to its idle position.

In its return travel, the piston 26 also returns the shells 42, 44 and their centring ring 66 when the radial flange 76 on the inner shell 42 comes into abutment against the front transverse wall 34 of the housing 28.

Such a ram therefore has the advantage of having a significant useful travel compared with its axial size but it also has the advantage of dissociating, on the one hand, the surfaces on which sealing is produced and, on the other hand, the guide surface of the piston.

It will be noted that the inner ring of the ball bearing of the clutch release bearing 12 (FIGS. 5 to 7) is profiled so as to act on the end of the fingers of the diaphragm and that the outer ring of the ball bearing 12 has a radial rim directed towards the inside in contact with the front transverse face 34 of the piston 26 under the action of an axially acting elastic washer 2, in this case of the Belleville washer type, engaged in a groove formed in the free end in the form of a nose which the piston has beyond its face 34.

The bearing 12 is therefore of the held self-centring type, a radial clearance existing between the nose of the piston and the radial rim of the bearing 12.

Of course, the bearing 12 can be fitted on the nose of the piston 26 so that the bearing is not necessarily self-centring.

The bellows 40 is anchored in twisted metal holding pieces (not given reference numerals) on which the ends of the return spring 36 bear. One of these pieces bears against a shoulder on the body 38, while the other piece is anchored in the piston 26.

It is, of course, possible to eliminate this piece by providing the outer ring of the bearing 12 with a radial rim directed radially towards the outside so as to affix the bellows 40. In this case, the guide tube 14 is made of metal and has at the rear a radial rim 3 directed towards the outside. This rim 3 (FIG. 5) is engaged in a step on the rear face of the outer body 38 having, in a known manner, lugs (not visible) for fixing it to a fixed part 4 of the vehicle, in this case the casing of the gearbox.

The tube 14 is thus fixed by gripping between the body 38 and the casing 4. The tube 14 is therefore separate from the body 38, which makes it easy to machine the said body 38. Furthermore, this tube 14 is made of metal and is thin. Of course, the rim 3 is provided with at least one degassing opening 5 to facilitate the movement of the piston.

Naturally, the control fluid supplying the chamber 16 can be gaseous or hydraulic in nature. In the example embodiment depicted, the fluid is, non limitatively, hydraulic in nature.

What is claimed is:

1. A fluid pressure ram, for controlling the clutch release bearing of a diaphragm clutch of a motor vehicle, the ram having: a fixed annular cylindrical control chamber supplied with pressurized fluid and defined radially by axially oriented inner and outer cylindrical partitions, wherein one axial end of the chamber is closed off by a piston which has an annular cylindrical housing defined radially by axially oriented inner and outer cylindrical walls, and open axially in the direction of the chamber, wherein the piston slides axially between a retracted position and a protruding position, when in the retracted position of the piston, the inner partition of the chamber is received in the housing and the outer wall of the housing is received in the chamber, wherein the piston, in the protruding position, is fully released axially from the fixed chamber, wherein two axially oriented cylindrical shells, inner and outer, are provided, which are each interposed between a partition of the chamber and a wall of the housing, respectively inner and outer, wherein the shells are arranged axially in line with the chamber when the piston is in the retracted position, and wherein the shells are able to slide axially with respect to the piston and with respect to the chamber in order to define, in the protruding position of the piston, an intermediate annular chamber which axially extends the fixed chamber and which is closed off axially by the piston.

2. The ram of claim 1, wherein the piston is guided axially on a fixed guide tube.

3. The ram of claim 1, wherein the clutch release bearing is mounted on the free end of the piston.

4. The ram of claim 1, wherein a centring ring, having an inner cylindrical face and an outer cylindrical face, is provided for the shells which is cylindrical overall, the inner cylindrical face of the centring ring slides on the outer cylindrical face of the inner partition of the chamber and the outer cylindrical face of the centring ring slides on the inner face of the outer wall of the piston, and there are provided means of centering each of the shells with respect to the centring ring, and the centring ring is provided with passages to afford free circulation of the pressurized fluid between the fixed chamber and the housing of the piston.

5. The ram of claim 4, wherein the outer surface of the centring ring is provided with a radial groove arranged axially substantially at a center of the ring.

6. The ram of claim 4, wherein the passages in the centring ring are produced in the form of axial slots evenly distributed angularly.

7. The ram of claim 6, wherein the slots alternatively open out in opposite axial ends of the centring ring.

8. The ram of claim 7, wherein the inner and outer shell each have a radial flange which is arranged at a first axial end thereof said radial flanges of the inner and outer shells being respectively received in the housing and the chamber, wherein said flanges are directed radially in the direction of the centring ring on which bears a peripheral edge of the flange to center the shell with respect to the centring ring.

9. The ram of claim 8, wherein the peripheral edge of the radial flange is received in a radial step arranged at a corresponding axial end of the centring ring.

10. The ram of claim 8, wherein a second axial end of each of the inner and outer shells are provided with an edge folded radially in the direction of the centring ring so as to form an axial stop which respectively cooperates with a complementary stop surface arranged on each of the inner surface of the inner partition of the chamber and the outer surface of the outer partition of the housing, so as to limit the travel of the inner and outer shells and the centring ring.

11. The ram of claim 8, wherein at least one of the shells has a radial flange provided with notches to assist the circulation of the pressurized fluid between the fixed chamber and the housing of the piston.

\* \* \* \* \*